United States Patent [19]

Kasuya

[11] Patent Number: 5,445,891
[45] Date of Patent: Aug. 29, 1995

[54] CURABLE ORGANOPOLYSILOXANE COMPOSITION CONTAINING NOVEL ADHESION PROMOTER

[75] Inventor: Akira Kasuya, Chiba Prefecture, Japan

[73] Assignee: Dow Corning Toray Silicon Co., Ltd., Tokyo, Japan

[21] Appl. No.: 338,913

[22] Filed: Nov. 14, 1994

[30] Foreign Application Priority Data

Nov. 17, 1993 [JP] Japan .................. 5-311263
Nov. 17, 1993 [JP] Japan .................. 5-311264

[51] Int. Cl.$^6$ .................................... B32B 15/08
[52] U.S. Cl. ............................ 428/450; 524/188; 524/243; 428/447
[58] Field of Search .............. 524/188, 243; 428/447, 428/450

[56] References Cited

U.S. PATENT DOCUMENTS

| | | | |
|---|---|---|---|
| 3,837,876 | 9/1974 | Mayuzumi et al. | 106/287 SB |
| 4,082,726 | 4/1978 | Mine et al. | 260/46.56 A |
| 4,727,168 | 2/1988 | Yoshino et al. | 556/408 |
| 5,342,870 | 8/1994 | Stein et al. | 528/15 |
| 5,364,921 | 11/1994 | Gray et al. | 528/15 |

FOREIGN PATENT DOCUMENTS

28309   3/1976   Japan .
80358   6/1979   Japan .
85224   3/1989   Japan .

*Primary Examiner*—Melvyn I. Marquis
*Attorney, Agent, or Firm*—Alexander Weitz

[57] ABSTRACT

There is disclosed a curable organopolysiloxane composition suitable for forming an adherent coating on metals which is durable under acidic conditions, said composition comprising:
  (A) an organopolysiloxane that contains at least 2 alkenyl groups in each molecule;
  (B) an organopolysiloxane that contains at least 2 silicon-bonded hydrogen atoms in each molecule;
  (C) a novel adhesion promoter; and
  (D) a hydrosilylation catalyst, wherein the adhesion promoter is prepared by reacting
  (a) an amine compound with the general formula $$R_nNH_{(3-n)}$$

in which R denotes a monovalent hydrocarbon group and n is 1 or 2, and
  (b) an aliphatically unsaturated epoxy compound, and, optionally, condensing the above reaction product with
  (c) a silicon compound that contains at least two silicon-bonded alkoxy groups in each molecule.

12 Claims, No Drawings

CURABLE ORGANOPOLYSILOXANE COMPOSITION CONTAINING NOVEL ADHESION PROMOTER

FIELD OF THE INVENTION

The invention relates to a curable organopolysiloxane composition. More specifically, the invention relates to a curable organopolysiloxane composition containing a novel adhesion promoter which imparts an adhesive character to the composition which is durable under acidic conditions.

BACKGROUND OF THE INVENTION

Addition reaction-curing organopolysiloxane compositions cure relatively rapidly at room temperature or when heated, and for this reason have been broadly examined as protectants for metal surfaces. These compositions are composed of an organopolysiloxane that contains at least 2 alkenyl groups in each molecule, an organopolysiloxane that contains at least 2 silicon-bonded hydrogen atoms in each molecule, and a hydrosilylation catalyst.

However, addition reaction-curing organopolysiloxane compositions generally exhibit poor adhesion, and this deficiency has necessitated the addition of an adhesion promoter in order to equip these compositions with self-bondability. A variety of adhesion promoters are known for this purpose. The following have already been disclosed as curable organopolysiloxane compositions with improved self-bonding properties: curable organopolysiloxane compositions that contain acryloxy-functional or methacryloxy-functional organoalkoxysilane (Japanese Patent Publication Number Sho 51-28309, curable organopolysiloxane compositions that contain the reaction product from epoxy-functional alkoxysilane and alkenyl-containing siloxane (Japanese Patent Publication Number Sho 52-48146 and Japanese Laid Open Patent Application Number Hei 1-85224, and adhesion promoter-containing curable organopolysiloxane compositions, for example, as disclosed in Japanese Laid Open Patent Application Number Sho 54-80358, whose adhesion promoter is prepared, for example, by the reaction of aminoalkylalkoxysilane and epoxyalkylalkoxysilane (refer to Japanese Laid Open Patent Application Number Sho 48-75633 or by reacting alkoxysilane with (i) active hydrogen-containing amine compound or aminoalkylalkoxysilane and (ii) epoxy-functional organic compound or epoxyalkylalkoxysilane, with the proviso that at least one of (i) and (ii) is the alkoxysilane (refer to Japanese Laid Open Patent Application Number Sho 61-72077.

When cured at around 150° C., the curable organopolysiloxane compositions disclosed in Japanese Patent Publication Numbers Sho 51-28309 and Sho 52-48146 and Japanese Laid Open Patent Application Number Hei 1-85224 exhibit an excellent adhesiveness for substrates such as iron and aluminum, but exhibit an inadequate adhesiveness for substrates such as nickel-plated substrates and copper. As a result, when these compositions are adhered on the surface of a substrate chosen from the latter group, delamination occurs rather easily when the adherent is treated with an acidic aqueous solution. In the case of the adhesion promoters taught in Japanese Laid Open Patent Application Numbers Sho 48-75633 and Sho 61-72077, foaming occurs when addition reaction-curing organopolysiloxane compositions that contain these adhesion promoters are subjected to heat curing since these adhesion promoters are extremely unstable because they contain both hydroxyl and silicon-bonded alkoxy in the molecule.

SUMMARY OF THE INVENTION

In specific terms, the present invention takes as its object the introduction of a highly adhesive curable organopolysiloxane composition whose adhesiveness is also very durable under acidic conditions as well as an adhesion promoter which imparts this superior adhesiveness to the composition.

The invention relates to a curable organopolysiloxane composition that is composed of (A) 100 weight parts of an organopolysiloxane that contains at least 2 alkenyl groups in each molecule;

(B) an organopolysiloxane that contains at least 2 silicon-bonded hydrogen atoms in each molecule, in a quantity sufficient to give 0.3 to 5.0 moles of silicon-bonded hydrogen in component (B) per 1 mole of total alkenyl in the composition;

(C) 0.3 to 10 weight parts of an adhesion promoter whose effective ingredient is the reaction product of a) an amine compound with the general formula

$R_nNH_{(3-n)}$ wherein R denotes monovalent hydrocarbon groups and n is 1 or 2 and (b) an aliphatically unsaturated epoxy compound; and (D) a catalytic quantity of a hydrosilylation catalyst. The present invention also relates to the above-described curable organopolysiloxane composition wherein the adhesion promoter (C') is the reaction product obtained by subjecting the reaction product of (a) an amine compound with the general formula

$R_nNH_{93-n)}$ wherein R denotes monovalent hydrocarbon groups and n is 1 or 2 and (b) an aliphatically unsaturated epoxy compound, to a condensation reaction with (c) a silicon compound that contains at least two silicon bonded alkoxy groups in each molecule.

The present invention is the subject of Japanese Patent Applications Hei 5-311263 and Hei 5-311264, the full specifications of which are hereby incorporated by reference.

DETAILED DESCRIPTION OF THE INVENTION

The organopolysiloxane comprising component (A), which is the base material of the present composition, consists of an organopolysiloxane that contains at least 2 alkenyl groups in each molecule. The alkenyl in component (A) is specifically exemplified by vinyl, allyl, butenyl, pentenyl, hexenyl, and decenyl, with vinyl being preferred. The bonding position for the alkenyl in component (A) is not critical, and the alkenyl may be bonded at the molecular chain terminals, or in nonterminal positions on the molecular chain, or at both positions. The non-alkenyl silicon-bonded organic groups in component (A) are specifically exemplified by alkyl groups such as methyl, ethyl, propyl, butyl, pentyl, hexyl, and so forth; cycloalkyl groups such as cyclohexyl, cycloheptyl, and so forth; aryl groups such as phenyl, tolyl, xylyl, and so forth; aralkyl groups such as benzyl, phenethyl, and so forth; and halogenated alkyl groups such as 3,3,3-trifluoropropyl, chloromethyl, and so forth. Methyl preferably makes up at least half of the non-alkenyl silicon-bonded organic groups in component (A) because this affords good economics and an excellent adhesiveness. The molecular structure of component (A) is also not critical and is exemplified by straight-chain, partially branched straight-chain, branched, cyclic, and network structures. Straight-chain structures are preferred. No particular restrictions apply to the viscosity of component (A), but its viscosity at 25° C. preferably falls in the range of 100 to 1,000,000 centipoise since this affords excellent handling characteristics on the part of the resulting curable organopolysiloxane composition.

Subject organopolysiloxane (A) is exemplified as follows:
trimethylsiloxy-endblocked methylvinylpolysiloxanes;
trimethylsiloxy-endblocked dimethylsiloxane-methylvinylsiloxane copolymers;
trimethylsiloxy-endblocked methylphenylsiloxanemethylvinylsiloxane copolymers;
dimethylvinylsiloxy-endblocked dimethylpolysiloxanes;
dimethylvinylsiloxy-endblocked dimethylsiloxanemethylvinylsiloxane copolymers;
dimethylvinylsiloxy-endblocked methylphenylpolysiloxanes;
dimethylvinylsiloxy-endblocked methylphenylsiloxanemethylvinylsiloxane copolymers;
silicone resins composed of the $(CH_3)_3SiO_{\frac{1}{2}}$, $(CH_3)_2(CH_2=CH)SiO$, and $SiO_{4/2}$ units; and
silicone resins composed of the $(CH_3)_3SiO_{\frac{1}{2}}$, $(CH_3)_2(CH_2=CH)SiO_{\frac{1}{2}}$, $CH_3SiO_{3/2}$, and $SiO_{4/2}$ units.

Component (A) may also consist of combinations of two or more of the organopolysiloxanes provided above as examples.

The organopolysiloxane (B), which is a crosslinker for the present composition, consists of an organopolysiloxane that contains at least 2 silicon-bonded hydrogen atoms in each molecule. The bonding position for the silicon-bonded hydrogen in component (B) is not critical, and the silicon-bonded hydrogen may be bonded at the molecular chain terminals, or in nonterminal position on the molecular chain, or at both positions. The silicon-bonded organic groups in component (B) are specifically exemplified by alkyl groups such as methyl, ethyl, propyl, butyl, pentyl, hexyl, and so forth; cycloalkyl groups such as cyclohexyl, cycloheptyl, and so forth; aryl groups such as phenyl, tolyl, xylyl, and so forth; aralkyl groups such as benzyl, phenethyl, and so forth; and halogenated alkyl groups such as 3,3,3-trifluoropropyl, chloromethyl, and so forth. Methyl preferably makes up at least half of the silicon-bonded organic groups in component (B) because this affords good economics and an excellent adhesiveness. The molecular structure of component (B) is also not critical and is exemplified by straight-chain, partially branched straight-chain, branched, cyclic, and network structures. Straight-chain structures are preferred. No particular restrictions apply to the viscosity of component (B), but its viscosity at 25° C. preferably falls in the range of 5 to 1,000,000 centipoise since this affords excellent handling characteristics on the part of the resulting curable organopolysiloxane composition.

Subject organopolysiloxane (B) is exemplified as follows:
trimethylsiloxy-endblocked methylhydrogenpolysiloxanes;
trimethylsiloxy-endblocked dimethylsiloxanemethylhydrogensiloxane copolymers;
dimethylhydrogensiloxy-endblocked dimethylpolysiloxanes;
dimethylhydrogensiloxy-endblocked methylhydrogenpolysiloxanes;
dimethylhydrogensiloxy-endblocked dimethylsiloxanemethylhydrogensiloxane copolymers;
cyclic methylhydrogenpolysiloxanes;
cyclic dimethylsiloxane-methylhydrogensiloxane copolymers;
tetrakis(dimethylhydrogensiloxy) silane;
silicone resins composed of the $(CH_3)_2HSiO_{\frac{1}{2}}$, $(CH_3)_3SiO_{\frac{1}{2}}$, and $SiO_{4/2}$ units; and
silicone resins composed of the $(CH_3)_2HSiO_{\frac{1}{2}}$, $(CH_3)_3SiO_{\frac{1}{2}}$, $CH_3Si\,O_{3/2}$, and $SiO_{4/2}$ units.

Component (B) may also consist of combinations of two or more of the organopolysiloxanes provided above as examples.

Component (B) must be added to the present composition in a quantity that yields 0.3 to 5.0 moles of silicon-bonded hydrogen in component (B) per 1 mole of total alkenyl in the present composition. The curability of the curable organopolysiloxane composition is sharply reduced when the addition of component (B) provides less than 0.3 moles of silicon-bonded hydrogen from component (B) per 1 mole of total alkenyl in the present composition. At the other extreme, the cured organopolysiloxane will exhibit sharply reduced physical properties when the addition of component (B) provides more than 5.0 moles of silicon-bonded hydrogen from component (B) per 1 mole of total alkenyl in the present composition.

The novel adhesion promoter comprising component (C) is the component that imparts self-bondability to the present composition. The characteristic feature of this adhesion promoter (C) is that its effective ingredient is the reaction product of (a) an amine compound with the general formula $$R_nNH_{(3-n)}$$

wherein R denotes a monovalent hydrocarbon groups and n is 1 or 2 and (b) an aliphatically unsaturated epoxy compound.

The amine compound (a) is described by the following general formula $$R_nNH_{(3-n)}$$

wherein R denotes a monovalent hydrocarbon group, and is specifically exemplified by alkyl groups such as methyl, ethyl, propyl, butyl, pentyl, hexyl, and so forth; alkenyl groups such as vinyl, allyl, butenyl, pentenyl, hexenyl, and so forth; aryl groups such as phenyl, tolyl, xylyl, naphthyl, and so forth; and aralkyl groups such as benzyl, phenethyl, and so forth. Allyl and phenyl are preferred. The subscript n in the preceding formula is 1 or 2: when n is 1, the amine compound is a primary amine compound, and when n is 2, the amine compound is a secondary amine compound.

Subject amine compounds (a) are specifically exemplified by methylamine, ethylamine, n-propylamine, n-butylamine, tert-butylamine, dimethylamine, diethylamine, dipropylamine, di(n-butyl)amine, di(tert-butyl)amine, allylamine, butenylamine, diallylamine, methylaniline, allylaniline, and aniline. Allylamine and aniline are preferred.

The epoxy compound (b) is an aliphatically unsaturated epoxy compound. Epoxy compound (b) is specifically exemplified by allyl glycidyl ether, butenyl glycidyl ether, pentenyl glycidyl ether, 4-vinyl-1,2-epoxycyclohexane, 4-allyl-1,2-epoxycyclohexane, 4-butenyl-1,2-epoxycyclohexane, 4-pentenyl-1,2-epoxycyclohexane, glycidyl methacrylate, and glycidyl acrylate. Allyl glycidyl ether is preferred.

The adhesion promoter (C) is prepared by reacting the nitrogen-bonded hydrogen in component (a) with the epoxy group in component (b). This reaction proceeds at room temperature, but is accompanied by a substantial evolution of heat which creates the risk of a violent reaction course. The reaction is therefore preferably run by the gradual dropwise addition of component (b) into component (a) or the gradual dropwise addition of component (a) into component (b). Component (b) is preferably added to the preparative reaction so as to give a slight molar excess of epoxy groups of component (b) over nitrogen-bonded hydrogen of component (a). Even more desirably, component (b) is added in quantities that give 1.01 to 2 moles epoxy group of component (b) per mole nitrogen-bonded hydrogen of component (a). The basis for this preferred addition of component (b) is that the complete consumption of the nitrogen-bonded hydrogen in component (C) yields a substantial improvement in the curability of the present composition. There are no particular restrictions on the temperature in the subject reaction, but the recommended method consists of the gradual dropwise addition of component (a) while component (b) is heated to at least 70° C. Following completion of the reaction, the adhesion promoter (C) can be purified by distilling off unreacted component (b) under reduced pressure.

When allyl glycidyl ether is used as component (b) for the adhesion promoter (C), a reaction product with the following general formula will be the main component of the resulting adhesion promoter.

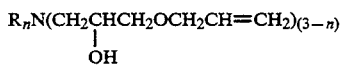

wherein R and n have their previously defined meanings.

The use of the above-mentioned adhesion promoter (C') is preferred in order to provide the curable organopolysiloxane composition of the invention with-adhesiveness for a particularly broad range of substrates. The effective ingredient in adhesion promoter (C') consists of the reaction product obtained by the condensation of a silicon compound (c) that contains at least 2 silicon-bonded alkoxy groups in each molecule, with the aforementioned reaction product from the amine compound (a) and aliphatically unsaturated epoxy compound (b).

Alkoxysilanes that contain at least two silicon-bonded alkoxy groups in each molecule and alkoxysilylalkyl-alkoxysilanes that contain at least two silicon-bonded alkoxy groups in each molecule may be cited as examples of the silicon compound (c). The alkoxysilanes encompassed by component (c) are specifically exemplified by
tetramethoxysilane,
tetraethoxysilane,
methyltrimethoxysilane,
ethyltrimethoxysilane,
vinyltrimethoxysilane,
allyltrimethoxysilane,
phenyltrimethoxysilane,
dimethyldimethoxysilane,
methylvinyldimethoxysilane,
methylphenyldimethoxysilane,
diphenyldimethoxysilane,
3-glycidoxypropyltrimethoxysilane, and
3-methacryloxypropyltrimethoxysilane.
Tetramethoxysilane is preferable. Specific examples of alkoxysilylalkylalkoxysilanes encompassed by component (c) include
bis(trimethoxysilyl)ethane,
bis(trimethoxysilyl)propane,
bis(trimethoxysilyl)butane,
bis(trimethoxysilyl)pentane,
bis(trimethoxysilyl)hexane,
bis(triethoxysilyl)ethane,
bis(triethoxysilyl)propane,
bis(methyldimethoxysilyl)ethane, and
bis(methyldimethoxysilyl)propane,
Bis(trimethoxysilyl)hexane is preferable. Combinations of two or more of the preceding alkoxysilanes and/or alkoxysilylalkyl-alkoxysilanes may also be used as component (c).

When allyl glycidyl ether is used as component (b) for adhesion promoter (C'), the resulting adhesion promoter has the following general formula

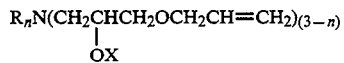

wherein R and n have their previously defined meanings and X denotes an alkoxysilyl group or alkoxysilylalkylsilyl group. The alkoxysilyl groups represented by X can be expressed by the following general formula

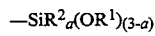

in which $R^1$=alkyl, $R^2$=monovalent hydrocarbon group, and a is an integer from 0 to 2.

$R^1$ in the preceding formula denotes alkyl, which is specifically exemplified by methyl, ethyl, propyl, butyl, pentyl, and hexyl, with methyl being preferred. $R^2$ in the preceding formula denotes monovalent hydrocarbon groups, which are specifically exemplified in this case by the same monovalent hydrocarbon groups as listed above. The subscript a in the formula is an integer from 0 to 2. The alkoxysilyl groups encompassed by X are specifically exemplified by trimethoxysilyl, triethoxysilyl, methyldimethoxysilyl, vinyldimethoxysilyl, phenyldimethoxysilyl, dimethylmethoxysilyl, methylvinylmethoxysilyl, methylphenylmethoxysilyl, diphenylmethoxysilyl, 3-glycidoxypropyldimethoxysilyl, and 3-methacryloxypropyldimethoxysilyl.

The alkoxysilylalkylsilyl groups represented by X can be expressed by the following general formula

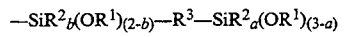

wherein $R^1$, $R^2$ and a have their previously defined meanings. $R^3$ in the preceding formula is an alkylene group, which is specifically exemplified by methylene, ethylene, methylmethylene, methylethylene, propylene, butylene, pentylene, hexylene, heptylene, and octylene, with hexylene being preferred. The subscript b is also an integer from 0 to 2. Specific alkoxysilylalkylsilyl groups encompassed by X include
trimethoxysilylethyldimethoxysilyl,
trimethoxysilylpropyldimethoxysilyl,
trimethoxysilylbutyldimethoxysilyl,
trimethoxysilylpentyldimethoxysilyl,
trimethoxysilylhexyldimethoxysilyl,
triethoxysilylethyldiethoxysilyl,
triethoxysilylpropyldiethoxysilyl,
methyldimethoxysilylethyldimethoxysilyl,
methyldimethoxysilylpropyldimethoxysilyl,
methyldimethoxysilylbutyldimethoxysilyl,
methyldimethoxysilylpentyldimethoxysilyl,
methyldimethoxysilylhexyldimethoxysilyl,
dimethylmethoxysilylethyldimethoxysilyl,
dimethylmethoxysilylpropyldimethoxysilyl,
dimethylmethoxysilylbutyldimethoxysilyl,
dimethylmethoxysilylpentyldimethoxysilyl, and
dimethylmethoxysilylhexyldimethoxysilyl.

This reaction consists of an alcohol-liberating condensation reaction between the silicon-bonded alkoxy in component (c) and the hydroxyl in the reaction product that is the main component of component (C). This condensation reaction can be accelerated by an alcohol-exchange catalyst. The desired reaction product can be obtained by removing the alcohol by-product by heating and/or the application of reduced pressure. This reaction can be expressed, for example, by the following equation.

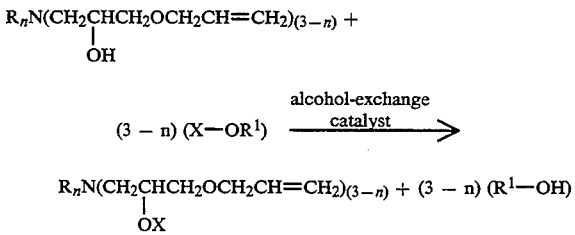

wherein R, R$^1$, X and n have their previously defined meanings.

There are no particular restrictions on the aforementioned alcohol-exchange catalyst as long as said catalyst is a compound that accelerates alcohol exchange. Specific examples of such catalysts include basic catalysts such as sodium hydroxide, potassium hydroxide, cesium hydroxide, potassium methylate, and so forth, and titanium catalysts such as tetrabutoxytitanium, and so forth. When the nitrogen in the adhesion promoter is strongly basic, the adhesion promoter will itself function as an alcohol-exchange catalyst, thus eliminating the need for a separate addition of alcohol-exchange catalyst. This reaction will proceed even at room temperature, but only very slowly. Accordingly, it is desirable to run this reaction by heating the system to a temperature of 50° C. to 200° C. It will also be desirable to remove the alcohol by-product at ambient pressure or under reduced pressure.

Component (C) or (C') is added to the present composition at 0.3 to 10 weight parts per 100 weight parts component (A). The self-bondability of the curable organopolysiloxane composition drops off sharply at component (C) or (C') additions of less than 0.3 weight parts per 100 weight parts component (A). On the other hand, the physical properties of the cured organopolysiloxane will be substantially impaired when component (C) or (C') is added in excess of 10 weight parts per 100 weight parts component (A).

The hydrosilylation catalyst comprising component (D) is a catalyst that accelerates the cure of the present composition. This hydrosilylation catalyst is exemplified by platinum catalysts such as platinum black, platinum supported on silica micropowder, platinum supported on carbon powder, chloroplatinic acid, alcohol solutions of chloroplatinic acid, platinum/olefin complexes, platinum/alkenylsiloxane complexes, platinum/beta-diketone complexes, platinum/phosphine complexes, and so forth; rhodium catalysts such as rhodium chloride, rhodium chloride/di(n-butyl)sulfide complex, and so forth; and palladium catalysts. In the present invention, component (D) is preferably a platinum catalyst when the monovalent hydrocarbon group bonded to the nitrogen in component (C) is alkyl or aryl. On the other hand, component (D) is preferably a rhodium catalyst when the monovalent hydrocarbon group bonded to the nitrogen in component (C) is alkenyl. Component (D) should be added to the present composition in a catalytic quantity. In specific terms, the preferred addition gives 0.1 to 500 ppm catalyst metal in the composition.

The curable organopolysiloxane composition according to the invention is prepared by mixing the aforementioned components (A) through (D) to homogeneity. Components which may be added to the invention composition on an optional basis are exemplified by inorganic fillers such as dry-process silica, wet-process silica, crystalline silica, diatomaceous earth, silica balloons, calcium carbonate, carbon black, titanium dioxide, aluminum oxide, zinc oxide, and so forth, and also colorants, heat stabilizers, antioxidants, and flame retardants. An acetylenic compound, amine compound, mercaptan compound, phosphorus compound, or the like, may be added in order to control the cure rate of the curable organopolysiloxane composition of the present invention. The following may be added in order to obtain additional improvements in the self-bondability of the-curable organopolysiloxane composition of the invention: 3-glycidoxypropyltrimethoxysilane, 3-methacryloxypropyltrimethoxysilane, vinyltrimethoxysilane, allyltrimethoxysilane, tetramethoxysilane, 1,5-bis(trimethoxysilyl)hexane, 1,2-dimethyl-1,1,2,2-tetramethoxydisilane, or the reaction mixture from 3-glycidoxypropyltrimethoxysilane and methylvinylcyclosiloxane. Unreactive silicone oils may be added in order to improve the physical properties of the cured organopolysiloxane.

The curable organopolysiloxane composition of the invention can be prepared by mixing the various components described hereinbefore to homogeneity. No specific restrictions apply to the equipment to be used for preparation of the curable organopolysiloxane composition of the invention, and, for example, a planetary mixer, kneader mixer, screw mixer, impeller mixer, static mixer, 2-roll mill, 3-roll mill, or twin-screw extruder can be used.

The curable organopolysiloxane composition of the invention can be cured at room or elevated temperature. However, in order to obtain an excellent self-bondability, the preferred curing procedure consists of heating the curable organopolysiloxane composition on the adherent to 70° C. to 200° C.

The curable organopolysiloxane composition of the invention as described above exhibits an excellent self-bondability to metal surfaces. In particular, it is strongly adhesive to the surface of copper, which is widely used in the electrical and electronic sectors. The curable organopolysiloxane composition of the invention can therefore be used as a mask or solder resist during the partial plating of copper conductors. The curable organopolysiloxane composition of the invention exhibits a superior adhesiveness that appears immediately upon curing, and its adhesiveness is also very durable to challenge by acidic conditions. As a result of these attributes, this composition can be used for various types of masks, sealants, potting materials, coatings, and so forth.

EXAMPLES

The curable organopolysiloxane composition of the present invention is described below in greater detail through working examples. The adhesiveness was evaluated as follows: either immediately after the curable organopolysiloxane composition had been cured into silicone rubber by heating on the adherent, or after acid challenge of the adhesiveness, the silicone rubber was peeled off using a spatula and the performance at this point was rated. Good adhesion by the silicone rubber to the adherent was scored as "++"; partial delamination was scored as "+"; and complete delamination was scored as "x".

REFERENCE EXAMPLE 1

285 g of allyl glycidyl ether was placed in a 500-Ml four-necked flask equipped with a stirrer, thermometer, reflux condenser, and addition funnel. 57 g of allylamine was then added dropwise from the addition funnel while regulating the system so the temperature did not exceed 150° C. The system was reacted for 2 hours at 150° C. after addition of the allylamine. This was followed by removal of the unreacted allyl glycidyl ether by stripping to give a moderately brown liquid product. Analysis of this liquid product by $^1$H-nuclear magnetic resonance spectroscopic analysis (NMR), infrared spectroscopic analysis (IR), and gas chromatographic/mass spectrometric analysis (GC/MASS) confirmed it to be an adhesion promoter (designated as adhesion promoter (A)) whose main component was the following compound.

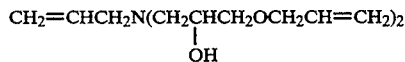

REFERENCE EXAMPLE 2

201 g of allyl glycidyl ether was placed in a 500-Ml four-necked flask equipped with a stirrer, thermometer, reflux condenser, and addition funnel. After the system had been heated to 140° C., 65.9 g of aniline was added dropwise from the addition funnel while regulating the system so the temperature did not exceed 160° C. The system was reacted for 2 hours at 150° C. after addition of the aniline. This was followed by removal of the unreacted allyl glycidyl ether by stripping to give a moderately brown liquid product. This liquid product was distilled at 150° C./0.2 torr using a thin-film distillation apparatus to give a moderately yellow liquid product. Analysis of this liquid product by NMR, IR, and GC/MASS confirmed it to be an adhesion promoter (designated as adhesion promoter (B)) whose main component was the following compound.

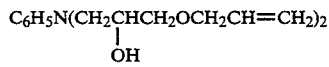

REFERENCE EXAMPLE 3

100 g of the compound synthesized in Reference Example 1 and 213.3 g of tetramethoxysilane were placed in a 500-Ml four-necked flask equipped with a stirrer, thermometer, and distillation setup. 0.04 g of potassium hydroxide was added to this system, and the system was heated while stirring. During this period, the methanol by-product was removed through a 20-cm Vigreux distillation column. The system was cooled to room temperature after methanol evolution had ceased. The potassium hydroxide was then neutralized by the addition of 1.1 g of propionic acid. The unreacted propionic acid and tetramethoxysilane were removed by stripping to give a liquid product. Analysis of this liquid product by IR confirmed the disappearance of the peaks attributable to hydroxyl. Analysis of this liquid product by NMR and GC/MASS confirmed it to be an adhesion promoter (designated as adhesion promoter (C)) whose main component was the following compound.

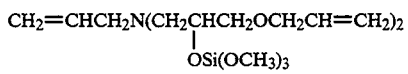

REFERENCE EXAMPLE 4

51.1 g of the compound prepared in Reference Example 2, 100 g of bis(trimethoxysilyl)hexane, and 1.5 g of tetrabutoxytitanium were placed in a 500-Ml four-necked flask equipped with a stirrer, thermometer, and distillation setup, and the system was heated to 150° C. under reduced pressure produced by an aspirator. The methanol by-product was recovered in a dry ice-acetone trap, and 11 g of methanol by-product was obtained. After methanol production had ceased, the system was cooled to give a liquid product. Analysis of this liquid product by IR confirmed the disappearance of the peaks attributable to hydroxyl. Analysis of this liquid product by NMR and GC/MASS confirmed it to be an adhesion promoter (designated as adhesion promoter (D)) whose main component was the following compound.

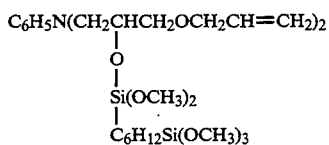

REFERENCE EXAMPLE 5

495.6 g of 3-glycidoxypropyltrimethoxysilane and 221 g of 3-aminopropyltriethoxysilane were placed in a 1-liter four-necked flask equipped with stirrer and thermometer. Stirring this system for 3 hours at 100° C. produced a viscous adhesion promoter (E). Analysis of this adhesion promoter by IR confirmed the disappearance of the peaks attributable to the N—H bond.

EXAMPLE 1

A curable organopolysiloxane composition in accordance with the invention was prepared by mixing the following to homogeneity: 100 weight parts of dimethylvinylsiloxy-endblocked dimethylpolysiloxane with an average degree of polymerization of 300 and a vinyl group content of 0.24 weight %; a trimethylsiloxy-endblocked methylhydrogenpolysiloxane with an average degree of polymerization of 40 and a silicon-bonded hydrogen content of 1.5 weight % (this component was added in sufficient quantity to give 1.5 moles silicon-bonded hydrogen per mole total alkenyl in the composition); 11 weight parts of fumed silica (specific surface = 200 m$^2$/g) whose surface had been treated with hexamethyldisilazane; 2.2 weight parts of adhesion promoter (A); rhodium chloride/di(n-butyl)sulfide complex in an amount sufficient to give a rhodium metal content in the composition of 10 ppm; and 0.02 weight parts of phenylbutynol.

This curable organopolysiloxane composition was coated on each of the substrates shown in Table 1 and cured to give the silicone rubber by heating for 1 hour at 150° C. The silicone rubber was in each case peeled from the substrate using a spatula in order to evaluate the adhesion. The results are reported in Table 1.

EXAMPLE 2

A curable organopolysiloxane composition in accordance with the invention was prepared by mixing the following to homogeneity: 100 weight parts of dimethylvinylsiloxy-endblocked dimethylpolysiloxane with an average degree of polymerization of 300 and a vinyl group content of 0.24 weight %; a trimethylsiloxy-endblocked methylhydrogenpolysiloxane with an average degree of polymerization of 40 and a silicon-bonded hydrogen content of 1.5 weight % (this component was added in sufficient quantity to give 1.5 moles silicon-bonded hydrogen per mole total alkenyl in the composition); 11 weight parts of fumed silica (specific surface = 200 m$^2$/g) whose surface had been treated with hexamethyldisilazane; 2.2 weight parts of adhesion promoter (B); a chloroplatinic acid/vinylsiloxane complex in an amount sufficient to give a platinum metal content in the composition of 10 ppm; and 0.02 weight parts of phenylbutynol.

This curable organopolysiloxane composition was coated on each of the substrates shown in Table 1 and cured to give the silicone rubber by heating for 1 hour at 150° C. The silicone rubber was in each case peeled from the substrate using a spatula in order to evaluate the adhesion. The results are reported in Table 1.

EXAMPLE 3

A curable organopolysiloxane composition was prepared using the procedure of Example 1, but in this case using adhesion promoter (C) in place of the adhesion promoter (A) used in Example 1. The adhesiveness was evaluated as in Example 1, and these results are reported in Table 1.

EXAMPLE 4

A curable organopolysiloxane composition was prepared using the procedure of Example 2, but in this case using adhesion promoter (D) in place of the adhesion promoter (B) used in Example 2. The adhesiveness was evaluated as in Example 2, and these results are reported in Table 1.

COMPARATIVE EXAMPLE 1

A curable organopolysiloxane composition was prepared using the procedure of Example 2, but in this case using adhesion promoter (E) in place of the adhesion promoter (B) used in Example 2. The adhesiveness was evaluated as in Example 2, and these results are reported in Table 1.

COMPARATIVE EXAMPLE 2

A curable organopolysiloxane composition was prepared using the procedure of Example 2, but in this case omitting the adhesion promoter (B) used in Example 2. The adhesiveness was evaluated as in Example 2, and these results are reported in Table 1.

TABLE 1

| | present invention | | | | comparative examples | |
|---|---|---|---|---|---|---|
| | Ex. 1 | Ex. 2 | Ex. 3 | Ex 4 | Comp. Ex. 1 | Comp. Ex. 2 |
| adhesion promoter | A | B | C | D | E | none |
| appearance of the silicone rubber | ++ | ++ | ++ | ++ | x foaming | ++ |
| adhesion | | | | | | |
| aluminum | ++ | ++ | ++ | ++ | ++ | ++ |
| copper | ++ | ++ | ++ | ++ | ++ | x |
| stainless steel SUS304 | ++ | ++ | ++ | ++ | ++ | ++ |
| nickel | ++ | ++ | ++ | ++ | ++ | ++ |
| glass | ++ | ++ | ++ | ++ | ++ | ++ |
| glass-epoxy resin | ++ | ++ | ++ | ++ | ++ | x |
| polybutylene terephthalate | ++ | ++ | ++ | ++ | ++ | x |
| nylon 6 | ++ | x | ++ | ++ | x | x |
| polyphenylene sulfide | x | x | + | x | x | x |

EXAMPLE 5

A curable organopolysiloxane composition in accordance with the present invention was prepared by mixing the following to homogeneity: 80 weight parts of dimethylvinylsiloxy-endblocked dimethylpolysiloxane with an average degree of polymerization of 300 and a vinyl group content of 0.24 weight %; 20 weight parts of silicone resin composed of siloxane units with the formulas (CH$_3$)SiO$_{\frac{1}{2}}$, (CH$_2$=CH)(CH$_3$)$_2$SiO$_{\frac{1}{2}}$, and SiO$_{4/2}$ (vinyl group content = approximately 2 weight %); a trimethylsiloxy-endblocked methylhydrogenpolysiloxane with an average degree of polymerization of 40 and a silicon-bonded hydrogen content of 1.5 weight % (this component was added in sufficient quantity to give 1.5 moles silicon-bonded hydrogen per mole total alkenyl in the composition); 14.3 weight parts of fumed silica (specific surface = 200 m$^2$/g) whose surface had been treated with hexamethyldisilazane; 2.3 weight parts of adhesion promoter (A); a rhodium chloride/di(n-butyl)sulfide complex in an amount sufficient to give a rhodium metal content in the composition of 10 ppm; and 0.02 weight parts of phenylbutynol.

This curable organopolysiloxane composition was applied to copper plate at a coating thickness of 50 micrometers, and cured to give the silicone rubber by heating the coated plate for 1 hour at 150° C. The adhesion was then evaluated by peeling the silicone rubber from the copper plate using a spatula. In addition, the silicone rubber bonded on the copper plate was immersed for 10 minutes in a 10% aqueous solution of hydrochloric acid at 50° C., and the adhesion was evalu-

EXAMPLE 6

A curable organopolysiloxane composition in accordance with the present invention was prepared by mixing the following to homogeneity: 80 weight parts of dimethylvinylsiloxy-endblocked dimethylpolysiloxane with an average degree of polymerization of 300 and a vinyl group content of 0.24 weight %; 20 weight parts of silicone resin composed of siloxane units with the formulas $(CH_3)_3SiO_{\frac{1}{2}}$, $(CH_2=CH)(CH_3)_2SiO_{\frac{1}{2}}$, and $SiO_{\frac{1}{2}}$(vinyl group content=approximately 2 weight %); a trimethylsiloxy-endblocked methylhydrogenpolysiloxane with an average degree of polymerization of 40 and a silicon-bonded hydrogen content of 1.5 weight % (this component was added in sufficient quantity to give 1.5 moles silicon-bonded hydrogen per mole total alkenyl in the composition); 14.3 weight parts of fumed silica (specific surface=200 m²/g) whose surface had been treated with hexamethyldi-silazane; 2.3 weight parts of adhesion promoter (B); a chloroplatinic acid/vinylsiloxane complex in an amount sufficient to give a platinum metal content in the composition of 10 ppm; and 0.02 weight parts of phenylbutynol.

This curable organopolysiloxane composition was applied to copper plate at a coating thickness of 50 micrometers, and cured to give the silicone rubber by heating the coated plate for 1 hour at 150° C. The adhesion was then evaluated by peeling the silicone rubber from the copper plate using a spatula. In addition, the silicone rubber bonded on the copper plate was immersed for 10 minutes in a 10% aqueous solution of hydrochloric acid at 50° C., and the adhesion was evaluated following this immersion. The results are reported in Table 2.

EXAMPLE 7

A curable organopolysiloxane composition was prepared using the procedure of Example 5, but in this case using adhesion promoter (C) in place of the adhesion promoter (A) used in Example 5. The adhesiveness was evaluated as in Example 5, and these results are reported in Table 2.

EXAMPLE 8

A curable organopolysiloxane composition was prepared using the procedure of Example 6, but in this case using adhesion promoter (D) in place of the adhesion promoter (B) used in Example 6. The adhesiveness was evaluated as in Example 6, and these results are reported in Table 2.

COMPARATIVE EXAMPLE 3

A curable organopolysiloxane composition was prepared using the procedure of Example 6, but in this case omitting the adhesion promoter (B) used in Example 6. The adhesiveness was evaluated as in Example 6, and these results are reported in Table 2.

COMPARATIVE EXAMPLE 4

A curable organopolysiloxane composition was prepared using the procedure of Example 6, but in this case using tetramethoxysilane (TMS) in place of the adhesion promoter (B) used in Example 6. The adhesiveness was evaluated as in Example 6, and these results are reported in Table 2.

COMPARATIVE EXAMPLE 5

A curable organopolysiloxane composition was prepared using the procedure of Example 6, but in this case using bis(trimethoxysilyl)hexane (BTMSH) in place of the adhesion promoter (B) used in Example 6. The adhesiveness was evaluated as in Example 6, and these results are reported in Table 2.

TABLE 2

| | present invention | | | | comparative examples | | |
|---|---|---|---|---|---|---|---|
| | Ex. 5 | Ex. 6 | Ex. 7 | Ex. 8 | Comp. Ex. 3 | Comp. Ex. 4 | Comp. Ex. 5 |
| adhesion promoter | A | B | C | D | none | TMS | BTMSH |
| adhesion initial | ++ | ++ | ++ | ++ | x | ++ | ++ |
| after treatment with hydrochloric acid | ++ | ++ | ++ | ++ | x | x | x |

That which is claimed is:

1. A curable organopolysiloxane composition comprising:
   (A) 100 parts by weight of an organopolysiloxane that contains at least 2 alkenyl groups in each molecule; and
   (B) an organopolysiloxane that contains at least 2 silicon-bonded hydrogen atoms in each molecule, in a quantity sufficient to provide 0.3 to 5.0 moles of silicon-bonded hydrogen in said component (B) per 1 mole of total alkenyl groups in the composition;
   (C) 0.3 to 10 parts by weight of an adhesion promoter which is a reaction product of
   (a) an amine compound having the general formula $R_nNH_{(3-n)}$ wherein R denotes a monovalent hydrocarbon group and n is 1 or 2, and
   (b) an aliphatically unsaturated epoxy compound; and
   (D) a catalytic quantity of a hydrosilylation catalyst.

2. The composition according to claim 1, wherein said organopolysiloxane (A) is selected from the group consisting of trimethylsiloxy-endblocked methylvinylpolysiloxanes, trimethylsiloxy-endblocked dimethylsiloxane-methylvinylsiloxane copolymers, trimethylsiloxy-endblocked methylphenylsiloxane-methylvinylsiloxane copolymers, dimethylvinylsiloxy-endblocked dimethylpolysiloxanes, dimethylvinylsiloxy-endblocked dimethylsiloxane-methylvinylsiloxane copolymers, dimethylvinylsiloxy-endblocked methylphenylpolysiloxanes, dimethylvinylsiloxy-endblocked methylphenylsiloxane-methylvinylsiloxane copolymers, silicone resins composed of the $(CH_3)_3SiO_{\frac{1}{2}}$, $(CH_3)_2(CH_2=CH)SiO_{\frac{1}{2}}$, and $SiO_{4/2}$ units, and silicone resins composed of the $(CH_3)_3SiO_{\frac{1}{2}}$, $(CH_3)_2(CH_2=CH)SiO_{\frac{1}{2}}$, $CH_3SiO_{3/2}$, and $SiO_{4/2}$ units and said organopolysiloxane (B) is selected from the group consisting of trimethylsiloxy-endblocked methylhydrogenpolysiloxanes, trimethylsiloxy-endblocked dimethylsiloxane-methylhydrogensiloxane copolymers, dimethylhydrogensiloxy-endblocked dimethylpolysiloxanes, dimethylhydrogensiloxy-endblocked methylhydrogenpolysiloxanes, dimethylhydrogensiloxy-endblocked dimethylsiloxane-methylhydrogensiloxane copolymers, cyclic methylhydrogenpolysiloxanes, cyclic dimethylsiloxane-methylhydrogensiloxane copolymers, tetrakis(dimethylhydrogensiloxy) silane, silicone resins composed of the $(CH_3)_2HSiO_{\frac{1}{2}}$, $(CH_3)_3SiO_{\frac{1}{2}}$, and $SiO_{4/2}$ units, and silicone resins composed of the $(CH_3)_2HSiO_{\frac{1}{2}}$, $(CH_3)_3SiO_{\frac{1}{2}}$, $CH_3SiO_{3/2}$, and $SiO_{4/2}$ units.

3. The composition according to claim 1, wherein said amine compound (a) is selected from the group consisting of methylamine, ethylamine, n-propylamine, n-butylamine, tert-butylamine, dimethylamine, diethylamine, dipropylamine, di(n-butyl)amine, di(tert-butyl)amine, allylamine, butenylamine, diallylamine, methylaniline, allylaniline and aniline and said epoxy compound (b) is selected from the group consisting of allyl glycidyl ether, butenyl glycidyl ether, pentenyl glycidyl ether, 4-vinyl-1,2-epoxycyclohexane, 4-allyl-1,2-epoxycyclohexane, 4-butenyl-1,2-epoxycyclohexane, 4-pentenyl-1,2-epoxycyclohexane, glycidyl methacrylate, and glycidyl acrylate.

4. The composition according to claim 2, wherein said amine compound (a) is selected from the group consisting of allylamine and aniline and said epoxy compound (b) is allyl glycidyl ether.

5. A curable organopolysiloxane composition comprising:
(A) 100 parts by weight of an organopolysiloxane that contains at least 2 alkenyl groups in each molecule;
(B) an organopolysiloxane that contains at least 2 silicon-bonded hydrogen atoms in each molecule, in a quantity sufficient to provide 0.3 to 5.0 moles of silicon-bonded hydrogen in said component (B) per 1 mole of total alkenyl groups in the composition;
(C') 0.3 to 10-parts by weight of an adhesion promoter prepared by
 (i) reacting
  (a) an amine compound with the general formula

wherein R denotes a monovalent hydrocarbon group and n is 1 or 2, and
  (b) an aliphatically unsaturated epoxy compound, and
 (ii) condensing the reaction product formed in step (i) with
  (c) a silicon compound that contains at least two silicon-bonded alkoxy groups in each molecule; and
(D) a catalytic quantity of a hydrosilylation catalyst.

6. The composition according to claim 5, wherein said organopolysiloxane (A) is selected from the group consisting of trimethylsiloxy-endblocked methylvinylpolysiloxanes, trimethylsiloxy-endblocked dimethylsiloxane-methylvinylsiloxane copolymers, trimethylsiloxy-endblocked methylphenylsiloxane-methylvinylsiloxane copolymers, dimethylvinylsiloxy-endblocked dimethylpolysiloxanes, dimethylvinylsiloxy-endblocked dimethylsiloxane-methylvinylsiloxane copolymers, dimethylvinylsiloxy-endblocked methylphenylpolysiloxanes, dimethylvinylsiloxy-endblocked methylphenylsiloxane-methylvinylsiloxane copolymers, silicone resins composed of the $(CH_3)_3SiO_{\frac{1}{2}}$, $(CH_3)_2(CH_2=CH)SiO_{\frac{1}{2}}$, and $SiO_{4/2}$ units, and silicone resins composed of the $(CH_3)_3SiO_{\frac{1}{2}}$, $(CH_3)_2(CH_2=CH)SiO_{\frac{1}{2}}$, $CH_3SiO_{3/2}$, and $SiO_{4/2}$ units and said organopolysiloxane (B) is selected from the group consisting of trimethylsiloxy-endblocked methylhydrogenpolysiloxanes, trimethylsiloxy-endblocked dimethylsiloxane-methylhydrogensiloxane copolymers, dimethylhydrogensiloxy-endblocked dimethylpolysiloxanes, dimethylhydrogensiloxy-endblocked methylhydrogenpolysiloxanes, dimethylhydrogensiloxy-endblocked dimethylsiloxane-methylhydrogensiloxane copolymers, cyclic methylhydrogenpolysiloxanes, cyclic dimethylsiloxane-methylhydrogensiloxane copolymers, tetrakis(dimethylhydrogensiloxy) silane, silicone resins composed of the $(CH_3)_2HSiO_{\frac{1}{2}}$, $(CH_3)_3SiO_{\frac{1}{2}}$, and $SiO_{4/2}$ units, and silicone resins composed of the $(CH_3)_2HSiO_{\frac{1}{2}}$, $(CH_3)_3SiO_{\frac{1}{2}}$, $CH_3SiO_{3/2}$, and $SiO_{4/2}$ units.

7. The composition according to claim 5, wherein said amine compound (a) is selected from the group consisting of methylamine, ethylamine, n-propylamine, n-butylamine, tert-butylamine, dimethylamine, diethylamine, dipropylamine, di(n-butyl)amine, di(tert-butyl)amine, allylamine, butenylamine, diallylamine, methylaniline, allylaniline and aniline, said epoxy compound (b) is selected from the group consisting of allyl glycidyl ether, butenyl glycidyl ether, pentenyl glycidyl ether, 4-vinyl-1,2-epoxycyclohexane, 4-allyl-1,2-epoxycyclohexane, 4-butenyl-1,2-epoxycyclohexane, 4-pentenyl-1,2-epoxycyclohexane, glycidyl methacrylate, and glycidyl acrylate and said alkoxysilane (c) is selected from the group consisting of tetramethoxysilane, tetraethoxysilane, methyltrimethoxysilane, ethyltrimethoxysilane, vinyltrimethoxysilane, allyltrimethoxysilane, phenyltrimethoxysilane, dimethyldimethoxysilane, methylvinyldimethoxysilane, methylphenyldimethoxysilane, diphenyldimethoxysilane, 3-glycidoxypropyltrimethoxysilane, 3-methacryloxypropyltrimethoxysilane, bis(trimethoxysilyl)ethane, bis(trimethoxysilyl)propane, bis(trimethoxysilyl)butane, bis(trimethoxysilyl)pentane, bis(trimethoxysilyl)hexane, bis(triethoxysilyl)ethane, bis(triethoxysilyl)propane, bis(methyldimethoxysilyl)ethane, and bis(methyldimethoxysilyl)propane.

8. The composition according to claim 6, wherein said amine compound (a) is selected from the group consisting of allylamine and aniline, said epoxy compound (b) is allyl glycidyl ether and said silicon compound is selected from the group consisting of tetramethoxysilane and bis(trimethoxysilyl)hexane.

9. A metal substrate coated with the composition of claim 1.

10. A metal substrate coated with the composition of claim 5.

11. The coated substrate of claim 9, wherein said substrate is copper.

12. The coated substrate of claim 10, wherein said substrate is copper.

* * * * *